United States Patent
Govyadinov et al.

(10) Patent No.: US 9,289,997 B2
(45) Date of Patent: Mar. 22, 2016

(54) DOPED BLACK INK WITH INCREASED LIGHT SCATTERING EFFICIENCY FOR NOZZLE HEALTH DETECTION

(75) Inventors: Alexander Govyadinov, Corvallis, OR (US); Brian M. Taff, Corvallis, OR (US); Vladek Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 324 days.

(21) Appl. No.: 13/876,749

(22) PCT Filed: Sep. 30, 2010

(86) PCT No.: PCT/US2010/050935
§ 371 (c)(1),
(2), (4) Date: Mar. 28, 2013

(87) PCT Pub. No.: WO2012/044307
PCT Pub. Date: Apr. 5, 2012

(65) Prior Publication Data
US 2013/0187974 A1    Jul. 25, 2013

(51) Int. Cl.
*B41J 2/01* (2006.01)
*B41J 2/165* (2006.01)
*B41J 2/21* (2006.01)
*B41J 2/125* (2006.01)
*C09D 11/324* (2014.01)
*C09D 11/38* (2014.01)
*C09D 11/40* (2014.01)

(52) U.S. Cl.
CPC .............. *B41J 2/16579* (2013.01); *B41J 2/125* (2013.01); *B41J 2/2107* (2013.01); *B41J 2/2142* (2013.01); *C09D 11/324* (2013.01); *C09D 11/38* (2013.01); *C09D 11/40* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ......... 347/100, 95, 96, 101, 88, 99, 21, 20, 9; 106/31.6, 31.13, 31.27; 523/160, 161
See application file for complete search history.

(56) References Cited

U.S. PATENT DOCUMENTS 6,416,868 B1    7/2002  Sullivan et al.
6,541,112 B1 *  4/2003  Swiler et al. .................. 428/402

(Continued)

FOREIGN PATENT DOCUMENTS

| EP | 1416022 | 5/2004 | | |
|---|---|---|---|---|
| JP | 2000017188 | 1/2000 | | |
| JP | 2000017188 | A * | 1/2000 | ............. C09D 11/00 |

*Primary Examiner* — Manish S Shah
(74) *Attorney, Agent, or Firm* — Thorpe, North & Western L.L.P.

(57) ABSTRACT

A method of monitoring nozzle condition in an array of inkjet nozzles includes ejecting at least one black ink drop from an inkjet nozzle, wherein the black ink includes a black colorant and a colloidal metal or metal-containing dopant. Light from a collimated light source is directed onto an ink drop-in-flight, and light-scatter from the drop is detected. The dopant increases light-scatter by the ink drop of an incident collimated light beam relative to the same ink without the dopant. From the detected light-scatter, an operational condition of the inkjet nozzle is determined. The dopant is visually undetectable in a printed mark made by the black ink, and the ink has a printed black optical density which is substantially the same as that of the same ink without the dopant.

13 Claims, 7 Drawing Sheets

(56) References Cited

U.S. PATENT DOCUMENTS

| | | |
|---|---|---|
| 6,758,894 B1 * | 7/2004 | Houmes .................. 106/31.9 |
| 2007/0024658 A1 | 2/2007 | Diol et al. |
| 2008/0186343 A1 | 8/2008 | Sugahara |
| 2009/0244141 A1 | 10/2009 | Govyadinov et al. |
| 2009/0244151 A1 | 10/2009 | Hendricks et al. |
| 2009/0244163 A1 | 10/2009 | Govyadinov |
| 2009/0273620 A1 | 11/2009 | Govyadinov et al. |
| 2010/0126562 A1 * | 5/2010 | Swiler et al. .................. 106/401 |

* cited by examiner

DOPED BLACK INK WITH INCREASED LIGHT SCATTERING EFFICIENCY FOR NOZZLE HEALTH DETECTION

BACKGROUND

To achieve adequate image/print quality (IPQ), single pass inkjet printers require precise knowledge of the health condition of each nozzle before commencing print jobs. For example, nozzles through which ink drops are ejected may become clogged or otherwise cease to operate properly. As a result, nozzle health detection or diagnostic apparatus have become an essential part of many printing devices to determine whether a printhead actually requires cleaning or other maintenance, or whether some nozzles should be inactivated and other compensatory nozzles used instead. Light-scattering drop detection technology (LSDD) has emerged as one valuable approach for diagnosing nozzle condition. LSDD generally includes using a collimated light source such as a laser beam to scatter light off from ink drops that are fired from one or a plurality of nozzles. One or more photodetectors are used to monitor the scattered light and to convert it into a corresponding electrical signal which is communicated to a processor configured to control functions of a drop ejection system. Efforts to increase sensitivity of LSDD technology have primarily relied upon incorporating higher-sensitivity, increased dynamic range photodetectors, and in some cases, higher-performance laser light sources combined with additional high-quality, precision-machined beamshaping optics. There is continuing interest in the development and use of LSDD technology for improving drop-on-demand and continuous single pass inkjet printing.

BRIEF DESCRIPTION OF THE DRAWINGS

For a detailed description of exemplary embodiments, reference will now be made to the accompanying drawings in which:

FIG. 4A shows a front-scatter detection configuration. FIG. 4B shows a back-scatter detection configuration. FIG. 4C shows a light-scatter detection configuration leveraging a light pipe coupled detector.

NOTATION AND NOMENCLATURE

Figure 1:
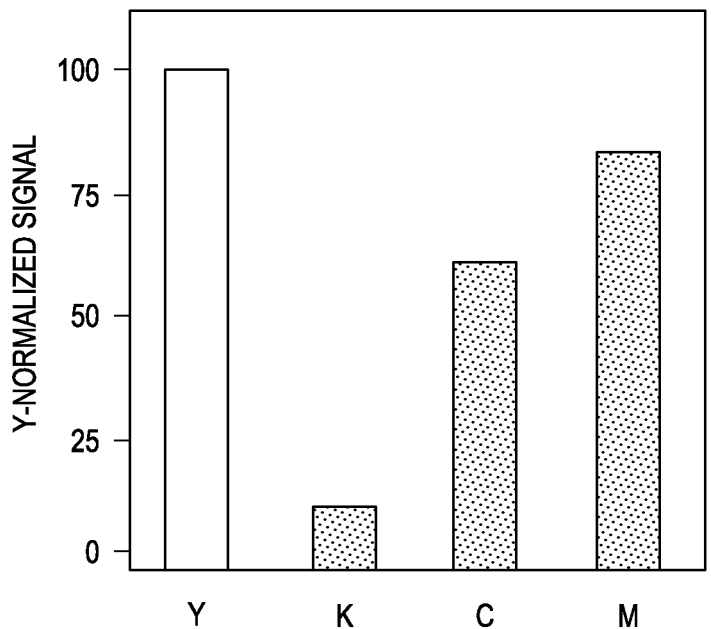
FIG. 1 is a bar graph illustrating the relative signal strengths of the yellow, cyan, magenta and carbon black-based black inks of a conventional ink set surveyed using a 650 nm laser illumination.

Certain terms are used throughout the following description and claims to refer to particular system components. As one skilled in the art will appreciate, technology companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."

The term "about" when referring to a numerical value or range is intended to encompass the values resulting from experimental error that can occur when taking measurements. Such measurement deviations are usually within plus or minus 10 percent of the stated numerical value.

The term "black optical density" or "KOD" when referring to an inkjet printed image is the measurement of the change in reflectance OD=$\log_{10}(I_i/I_r)$, where $I_i$ and $I_r$ are incident and reflected light intensities, respectively. The higher the KOD value, the darker the black colored image obtained.

The term "colorant," as used herein, refers to a pigment, dye, or a combination of both pigment and dye, capable of being dispersed or dissolved in an ink vehicle, and having color (i.e., wavelength selective absorption and or reflection).

"Liquid vehicle" or "ink vehicle," as used herein, refers to the vehicle in which colorant is dispersed or dissolved to form an ink. A wide variety of ink vehicles may be used with the compositions, systems, and methods according to various embodiments. Suitable ink vehicles may include, but are not limited to water, solvents, co-solvents, buffers, biocides, sequestering agents, viscosity modifiers, surfactants, surface-active agents, and/or mixtures thereof.

As used herein the term "ink-jet printing" refers to non-contact methods for producing images by deposition of ink droplets in a dot-by-dot on demand manner to an image-recording medium in response to appropriate commands, such as digital signals. Various methods may be employed to control the deposition of ink droplets on the image-recording medium to form the desired and/or required image. For example, in drop-on-demand ink-jet printing, individual ink droplets are projected as needed onto the image-recording medium to form the desired and/or required image. Common methods of controlling the projection of ink droplets in dropon-demand ink-jet printing include piezoelectric transducers and thermal bubble formation.

The term "light-scattering" refers to light that interacts with objects (e.g., an in-flight ink droplet) in an energetically elastic manner. In other words, the sum total of the kinetic energy present in the object and the light remains the same before and after the impinging light interacts with the object. Such interactions do not introduce wavelength shifts to the impinging light that becomes scattered after interfacing with the object. Light-scattering includes reflection, refraction, absorption, diffraction and interference of light from the object.

"Back-scattering" generally refers to light-scattered at angles greater than 90 degrees. In the context of the present disclosure, the back-scattering angles are typically in the range of about 135 to about 175 degrees.

The term "light-scattering signal strength" refers to the magnitude of the measured electrically-detectable response collected by in-system detectors used to assess nozzle health characteristics.

"Decap time" refers to the amount of time a printhead can be left uncapped and idle between instances of use and still fire properly upon resuming use. Typically, ink dries in an uncapped nozzle when exposed to air, often causing nozzle clogging, drop misdirection, the reduction or augmentation of measured drop velocities, and/or other firing defects.

The term "inkjet nozzle performance" refers to the ability of a print nozzle to maintain a predetermined ink drop stream direction (i.e., the ability to avoid misdirecting its ink drop stream), and to the ability of the nozzle to fire an ink drop stream at a reproducible velocity, e.g., with a velocity that does not deviate by more than ±10%.

Temperature, ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt. % to about 20 wt. % should be interpreted to include not only the explicitly recited concentration limits of 1 wt. % to about 20 wt. %, but also to include individual concentrations such as 2 wt. %, 3 wt. %, 4 wt. %, and sub-ranges such as 5 wt. % to 15 wt. %, 10 wt. % to 20 wt. %, and so forth.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to imply that the scope of the disclosure, including the claims, is limited to that embodiment.

Black Inkjet Inks

Black inkjet inks are typically based on carbon black dispersions, and are widely used for text and graphics inkjet printing. One reason for the widespread use of carbon black pigments is that carbon black has excellent light absorbing capabilities over the whole wavelength range of visible light, rendering truly black print performance at a low cost. In many printing applications, the black ink supply is used more often than other ink colors and it has proved to be the most challenging of the various ink colors to detect via LSDD technology. This challenge arises because the electromagnetically absorptive nature of carbon black within the optical wavelength range extends from the far UV wavelengths through the visible band and well into the near infrared and infrared portions of the spectrum. That property makes possible truly black prints, but also functions to absorb incident light from an LSDD source. The absorption of incident light by carbon black degrades the light's capacity to interact with drops and then, in turn, land on the detector in the form of reflected or scattered light. Conventional carbon black based inks typically produce a minimal scattering cross-section resulting in "stealth-like" performance in LSDD systems. The reduced light-scattering capacity of carbon black inks, compared to colored inks, confounds the ability to assess nozzle health and/or the viability of nozzles that dispense the black ink.

In the case of dye-based black inks, masking of LSDD is much more pronounced at excitation wavelengths lower than the near infrared range (NIR). Although the masking effect of dye-based black inks on light-scattering is generally lower than that of pigment-based black inks at any given wavelength, low K LSDD response is nevertheless problematic in some cases when assessment of nozzle condition is desired. As a result, practically any type of black ink may benefit from the addition of a LSDD enhancing agent or dopant, as described herein.

FIG. 1 is a bar graph illustrating the reduced signal strength of a conventional black ink (K) compared to conventional cyan, magenta and yellow inks (CMY). The relative back-scattering signal strength at 140° scattering angle (as measured between the detector and the incident light source) for a commercial CMYK ink set (Hewlett-Packard HP88, C9381A and C9382A) is readily apparent in FIG. 1. The signal strength for K is typically 10 times lower than the signals of CMY. In this comparison test, K was about 12 times lower than Y.

It was discovered that boosting the black ink light-scattering signal strength greatly aids assessment of nozzle condition or nozzle health detection. Just a slight signal boost in the black ink signal will, in many cases, provide more reliable black nozzle detection, and in some applications, makes feasible the use of significantly lower cost light sources such as LEDs instead of lasers.

Black inks with increased light-scattering characteristics are made by adding metal-based colloid additives to black ink formulations. These additives provide a particulate-reliant means for scattering larger fractions of incident light compared to the same black ink lacking such additives. This approach, which significantly increases light-scattering strength relative to background noise, makes possible better informed decisions regarding servicing needs, nozzle print masking, and other steps for insuring best quality rendered prints. The enhanced detection capacity of these additive-doped K inks better reports the jetting behaviors of affiliate nozzles in ways that reduce the potential for improperly grading a nozzle as "failed" when it is in fact viable. This improvement over non-additive-doped K inks, means that in many situations of use the printer avoids calling unnecessary servicing routines which might include requests for field service when the printer is functioning without complication, for example.

Black Colorant

Any suitable carbon pigment which provides acceptable optical density and print characteristics may be used to make a light-scattering enhanced black ink. Non-limiting examples are carbon black, graphite, vitreous carbon, charcoal, and combinations of those. In many instances, carbon black is preferred and may be manufactured by any of a variety of known methods or obtained commercially from such vendors as Cabot Corporation, Columbian Chemicals Company, Degussa A G, and E.I. DuPont de Nemours and Company. Non-limiting examples of commercially available carbon black pigments include Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V.

In most implementations, the carbon black pigments are about 5 nm to about 10 μm in diameter or longest dimension, and in some cases are about 10 nm to about 500 nm in diameter or longest dimension. In many instances, the carbon black pigment particles are about 20 to about 300 nm in diameter or longest dimension. For some implementations, the mean carbon black particle size is about 100 nm. Pigment particle size may be determined using any suitable light-scattering based tool for pigment particle size evaluation in dispersions. For example, one such commercially available light-scattering based device is NANOTRAC (Microtrac, Inc.). Mean particle diameter is generally volume-weighted mean particle diameter (Mv).

In most cases, the carbon pigment comprises about 0.1 wt. % to about 6 wt. % of the ink-jet ink composition. For some applications, the carbon pigment loading concentration is up to about 8-10 wt. % by weight of the ink. In most cases the maximum optical density of a carbon black ink is obtained at 4-5 wt. % pigment concentration.

A black dye is used in some instances instead of, or in addition to, a carbon black colorant in formulating a black inkjet ink. For some applications, combining a black dye and a black pigment offers the advantages of both dye and pigment colorants such as lightfastness and long-term durability of many pigments, and lower cost typical of many dyes. Some non-limiting examples of suitable commercially available black dyes are Pacified Reactive Black 31, Direct Black 168, Ilford K1334, Acid Black 52, Direct Black 170, Direct Black 22, Direct Black 19, Direct Black IJ Dye, Reactive Black 8, Solvent Black 13 and copper complexed azo black.

Light-Scatter Enhancing Dopants

A colloid metal-based additive ("dopant") contains particles that are no more than about 200 nm in diameter or longest dimension. In most cases, the dopant particles are in the range of about 5 nm to about 100 nm in diameter or longest dimension, and in some cases the mean size is in the range of about 10 nm to about 80 nm. In some applications, the dopant particles are rod-shaped. The dopant is, in most cases, a small fraction of the total ink weight to avoid degrading the visual appearance of prints or ink jettability. Particle size is determined, for example, by SAXS (small angle x-ray scattering) technique using any suitable commercially available apparatus.

The colloid additive serves to amplify black ink in-flight drop detection signals in notable ways by locally presenting non-uniformities that force incident light to deviate from straight-line trajectories. This signal enhancement provided by doped inks, which may in some applications be about 30-70% increased relative to the un-doped ink, offers avenues for mitigating the current dynamic range requirements imposed upon typical photodetectors. In most implementations, the amount of dopant in the black ink is sufficient to increase the back-scattering signal to a range where signal-to-noise ratio is at least 8 dB (2.5×). The concentration of dopant is in the range of about 0.10 to about 10 wt. % of the total ink weight. In most cases, the dopant is less than 3 wt. %, and for many applications is less than 1.5 wt. %. In some implementations, for example, a dopant concentration of about 1.0 wt. % provides satisfactory enhancement of back-scattering signals for drop-in-flight assessment of nozzle performance. For some applications the dopant content of a black ink formulation may be up to 5-8 wt. %, or even 10 wt. % of the total ink weight, without rendering the black optical density unacceptable, and without being visually detectable in the printed ink. In some, but not all black ink formulations, the "jettability" or capability of the ink to be jetted via an inkjet nozzle declines at dopant concentrations exceeding about 5 wt. %, and is generally unsatisfactory above about 10 wt. %. In post-formulation analysis efforts, the loading concentration of dopant particles (i.e., the wt. % of the ink that is dopant) may be determined by any quantitative chemical technique including, but not limited to, atomic absorption spectroscopy, IR spectroscopy, inductively coupled plasma optical emission spectroscopy (ICPOES).

All Group IB, IIB and III-VII metals of the Periodic Table of the Elements, including the transition, noble metals, semi-conductors and semi-metals (e.g., Si, Ge, Sn, As, Sb, Bi, and others), may be used for ink doping to boost light-scattering. For ease of reference, use of the term "metal" is intended to include the aforementioned metals, semi-conductors and semi-metals, where the context permits. While the Group IA and IIA elements (alkali and alkaline earth elements) also have very good metallic reflective properties, they are impractical for most ink doping applications due to their very high chemical reactivity, specifically, to water vapor and oxygen. If this drawback is resolved in a particular application, these elements are also good candidates for doping black inks to boost light-scattering.

In most applications, the back-scattered drop detection (BDD) response is preferably measured. BDD is a specific angular regime of LSDD in which the angle between the detector and the source is acute, as illustrated schematically in FIG. 4B. In some embodiments, silver, iridium, platinum, rhodium, ruthenium, silicon, hafnium, chromium or aluminum is used as the dopant, especially for applications in which the light-scattering detector assembly uses a light source that emits in the visible or near infrared wavelength range. In some embodiments, copper or gold is used as the dopant when near infrared light is to be used for detecting scattering. Non-limiting examples of some commercially available colloidal metals suitable for use in preparing a black ink with the enhanced light-scattering property are silver nanoparticle dispersions (Cabot Conductive Ink, Boston, Mass.; NanoGap, Spain; Xerox, Wilsonville, Oreg.), CCI-330 and gold nanoparticles as made available by Johnson Matthey (London, UK), nano copper, ruthenium, rhodium, platinum, iridium zinc and aluminum (Sigma Aldrich, St. Louis, Mo.). Dispersions of nano-sized noble metals are preferred, in most cases, because of their superior chemical stability in aqueous environment.

For some applications, semi-metals or semi-conductors may be preferred for use with visible or UV excitation wavelength ranges.

Without the presence of a masking pigment (e.g., carbon black), the back-scatter boosting effect is proportional to the overall metal amount or metal concentration (Me %) but not to the particle concentration ($N_{Me}$). Particle size of the dopant is important when a masking agent, such as carbon black pigment, is present in the ink formulation. Therefore, the smaller the dopant particles' size, the higher the dopant's concentration ($N_{Me}$) should be in the inkjet ink, at the same overall metal concentration (Me %), to obtain the same signal boost from the selected metal. As a practical matter, due to the fact that dopants are materials of high density and may tend to settle rapidly at large particle sizes, their particle size is limited to the range <100 nm, in most cases. In most applications, the signal boost is in the range of 30-70% per dopant wt. % in the ink over a dopant concentration range of about 0.10 wt. % to about 10 wt. % (wt. % by total weight of ink). Doped ink signal boost is proportional to Me %/Pig %, where Pig % is pigment (e.g., carbon black) or dye weight concentration.

Liquid Vehicle

Water or any other suitable liquid and any compatible co-solvent may be used to carry the pigment solids, soluble dyes and dopant particles, as well as any other desired ink components, in the disclosed inks. Some non-limiting examples of suitable co-solvents are aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. Co-solvents may be desired in some cases to reduce the rate of evaporation of water in the ink to minimize clogging or other properties of the ink such as viscosity, pH, surface tension, optical density, and print quality. Any of a variety of known buffering agents, such as TRIS buffer or MOPS buffer, may be added to an inkjet ink composition to maintain a desired pH. Still other additives which are known to be useful in inkjet ink compositions may be added in some embodiments. Non-limiting examples of these are binders, surfactants, biocides and dispersants.

In some implementations, the vehicle in which the black ink solids are dispersed, and/or a black dye is dissolved, is based on a non-aqueous solvent rather than being water based. For example, solvent-based black inks may be used in a piezoelectric inkjet printhead. Commercially available non-aqueous solvents, including but not limited to various hydrocarbons and oils, which are well known as vehicles for inkjet ink dyes, are suitable for carrying the present black pigments, dyes and dopants.

In most cases, the amplified scattering property of the disclosed inks not only enhances the ability to assess nozzle health via light-scatter drop detection (LSDD), but also avoids compromising the optical density of the ink. The metal doped inks impose no color shifts visible to the human eye. Another feature of most of the disclosed light-scattering-enhanced inks is that the metal-containing additives do not negatively impact ink decap time or jetting performance of the ink. The decap time of the doped inks, in most cases, is not increased above the decap time of the undoped ink by more than about 10%. In many cases, the decap time of a doped ink is the same as that of the undoped ink. An inkjet ink's jetting performance is not considered to be negatively impacted by the dopant if the doped ink is jettable (i.e., can be discharged from an inkjet nozzle), and does not cause a print nozzle to misdirect its ink drop stream, or to fire an ink drop stream at a velocity that differs more than ±10% from that of the undoped ink, or to eject an ink drop stream having a drop weight that differs more than ±10% from that of the undoped ink. The enhanced detection capability made possible by the present light-scattering-enhanced inks offers improved nozzle condition assessment and monitoring capabilities, and new flexibilities for improved printer servicing and maintenance.

Inkjet Ink Sets

An inkjet ink set with enhanced light-scattering properties includes at least one black ink comprising a liquid vehicle and a black colorant and a colloidal dopant dispersed in the vehicle. The colloidal dopant is present in an amount sufficient to cause back-scattering of a collimated light beam during its trajectory from the print-head to the media (i.e., drop-in-flight), said amount also being insufficient to be visually detectable by the human eye in a printed mark produced by the black ink when the ink is jetted onto a substrate. The ink set also includes one or more other ink. For example, the ink set may in some applications have cyan, magenta, yellow and black inks. In some cases the black ink is provided as a separate ink cartridge from a cyan, magenta and yellow ink cartridge. In some embodiments, one or more cyan, magenta or yellow ink may also contain a light-scatter enhancing amount of a metal-containing dopant.

Inkjet Printing and Monitoring Nozzle Condition

The light-scattering enhanced inks and ink sets may be used for inkjet printing in any suitable system equipped for jetting the inks and monitoring the ink drops for light-scattering properties. In some embodiments, a single pass inkjet printing system equipped with a LSDD assembly is employed. One such system is described in U.S. patent application Ser. No. 12/254,864 filed Mar. 25, 2008 (U.S. Pat. Pub. No. 20090244163). Still other printer/LSDD assemblies which may be suitably employed for ink jet printing and monitoring of nozzle condition are described in U.S. application Ser. No. 12/454,898 filed May 26, 2009 (U.S. Pat. Pub. No. 20090244151); U.S. patent application Ser. No. 12/381,873 filed Mar. 17, 2009 (U.S. Pat. Pub. No. 20090244141); and U.S. patent application Ser. No. 12/511,583 filed Jul. 29, 2009 (not yet published). In some applications, the condition of an individual nozzle is assessed or evaluated at any given point in time. In some implementations, multiple nozzles are concurrently evaluated for their respective conditions.

Figure 2:
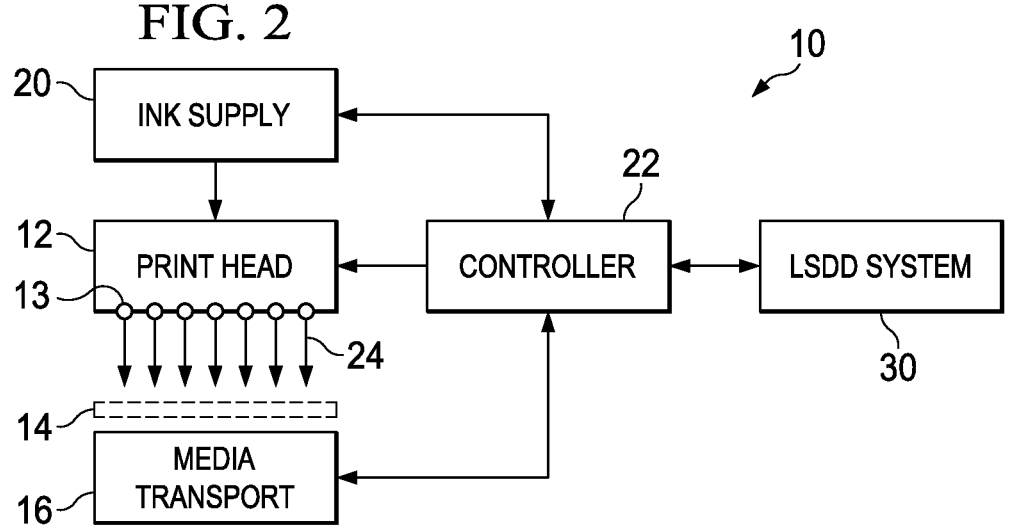
FIG. 2 is a schematic diagram of a light-scatter drop detection assembly in accordance with an embodiment.

FIG. 2 is a block diagram illustrating an embodiment of an inkjet printer 10 that includes a print head 12 which spans the width of a print media 14, or is configured to move back and forth across the print media, and dispenses ink drops 24 from one or more nozzles 13. Printer 10 also includes a media transport mechanism 16 for use with media 14, a detector assembly 30, and an ink supply 20. A controller 22 is in electronic communication with the print media transport 16, LSDD system 30, printhead 12 and ink supply 20.

Figure 3:
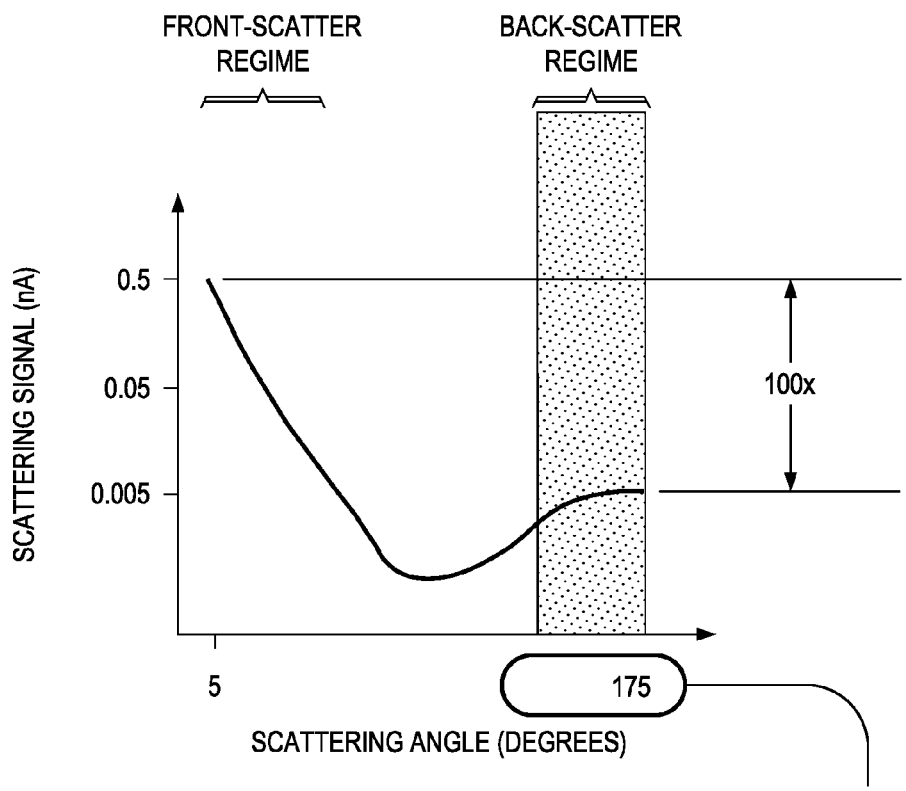
FIG. 3 is a graph comparing light-scattering signal strengths at small and large light source to detector angles in a front-scatter detection regime and a back-scatter detection regime.
Figure 4A:
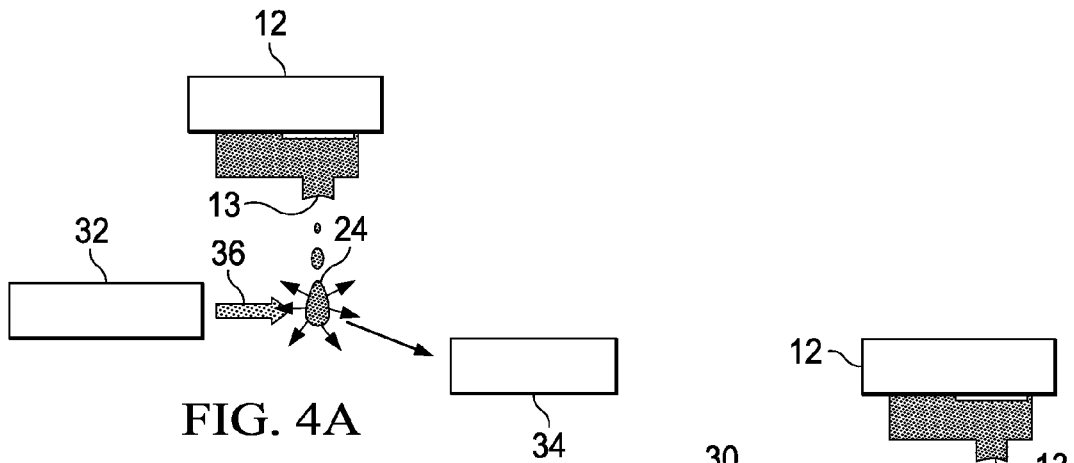
FIGS. 4A-C are schematic illustrations of light-scatter drop detection (LSDD) configurations employed in various embodiments.
Figure 4B:
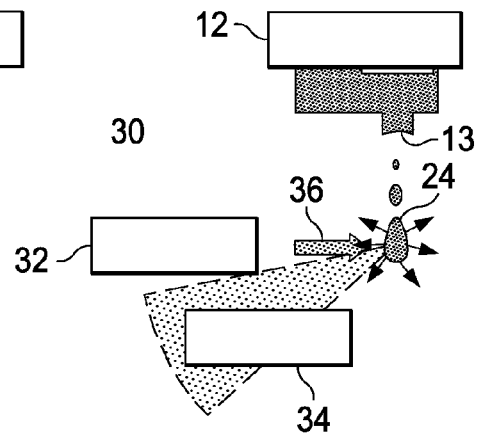
Figure 4C:
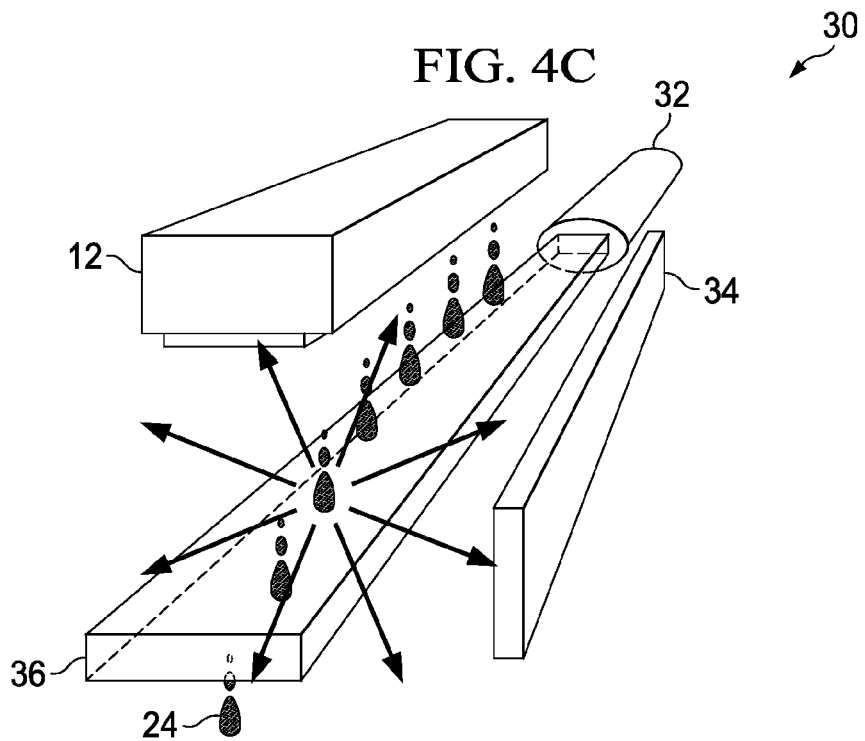

In some embodiments, a LSDD system is able to measure LSDD signals at angles ranging from approximately 0° to 175°. The precise scattering angle or angles and the corresponding signal strength required for assessing nozzle condition may vary, and are defined in each implementation by the light-scattering drop detector LSDD system's configuration and the printing system's specific constraints and requirements (as illustrated in FIGS. 4A-C). As illustrated in FIG. 3, a typical in-flight scatter response has a much greater signal strength observed at small angles (front-scattering angles of about 5°) compared to signal strength observed at larger angles (back-scattering angle of about 175°). The difference between front- and back-scattering signal strength is, in most cases, at least 100 fold. The system depicted schematically in FIG. 4A is configured to detect small angle (i.e., front) scattered light. A printhead and LSDD assembly 30 includes a light source 32 and photodetector 34 positioned such that the path of light (light beam 36) emitted from the source intercepts the flight of ink drop 24 from nozzle 13 of printhead 12. The photodetector receives front-scattered light from the doped ink drops 24. Scattered light is indicated by small arrows. The strongest LSDD signal is expected at low angle (front) scattering.

In the LSDD system depicted schematically in FIG. 4B, when the back-scattering signal is used for drop detection, the system may have a relatively smaller footprint, as both the light source and the detector are positioned on the same side of the printhead. For a given application, selection of the optimal detection angle to be used for assessing nozzle condition depends on the type of printer and pen configuration. In the case of a single path printer, it will usually be preferable from the standpoint of performance and cost, to employ a scanning back-scattering drop detector configuration. In such an implementa-tion the angle between the light source and the one or more detectors is fixed but the LSDD unit translates along the length of the printhead and/or printbar to assess jetting. Such systems are often less expensive than designs requiring detectors and optics that can monitor all nozzles at any time without the need for physically moving the location of the LSDD module. In some printer/LSDD system configurations, the LSDD assembly is a self-contained unit housing, for example, a collimated light source and photodetector(s), with the photodetector located next to the print zone in proximity to a capping and servicing station for the print head.

FIG. 4B illustrates a printhead and LSDD assembly 30 which includes a light source 32 and photodetector 34 positioned such that the path of light (light beam 36) emitted from the source intercepts the flight of ink drop 24 from nozzle 13 of printhead 12. The photodetector receives side scattered or back-scattered light (indicated by arrows) from the doped ink drops 24. The light source is any source of collimated light beam suitable for illuminating ink drops. For example, an edge emitting laser (EEL), vertical cavity surface emitting laser (VCSEL) or a light emitting diode (LED). In many implementations, a single incident light source is employed, accompanied by a single in-system photodetector. The light emitted by an LED source may be collimated by a lens to produce a narrow, substantially parallel beam. The photodetector reacts to the scattered light by producing a corresponding current, which is subsequently amplified by an amplifier. In some applications, the photodetector exhibits a large dynamic range to properly record scattering signals generated by distinct printed ink colors. The resulting signals from the photodetector are sampled and electrically processed to determine the presence and in some cases potentially information regarding the orientation and speed of the ejected ink drops, from which nozzle clogging or other malfunction is then imputed. Nozzle evaluation may be performed prior to printing, during normal printing operation or while the printer is in servicing mode. In some applications, a complete mapping of the health status of all nozzles on a given print head is performed prior to the start of a printing job. Stemming from such diagnostics, a printer controller may be programmed to redirect the function of a defective nozzle to another compensatory nozzle.

In some embodiments a print head is configured to jet a light-scattering enhanced inkjet ink at a firing frequency from 3 kHz to 12 kHz or from 12 kHz to 25 kHz. At these firing frequencies, in some embodiments the drop volumes range from about 1 to 10 picoliters (pL), and in some other embodiments the drop volumes range from about 10 pL to 20 pL.

In many printing and monitoring applications, a weak black ink scattering signal is overcome with use of a light-scattering enhanced ink. In some applications, high dynamic ranges of LSDD responses for the CMY and K inks of an inkset are obtained, where the un-doped K signal is about 10× lower than the CMY signals. This dynamic range is reduced by augmenting the K signal using a colloid additives-reliant approach, in which the LSDD response of the black ink (K) doped with metal-containing particles is at least 1.3 times greater than the same ink without the metal dopant. In some implementations, a black ink doped with metal-containing particles improves the light-scattering signal strength by about 4-6 fold compared to the same ink without the metal dopant particles. In many implementations, inkjet printing with a metal particle doped black ink makes robust nozzle health detection possible without compromising the optical density of black ink on paper.

While most metal particles have a high light-scattering signal, absorptive ink components in their proximity, such as carbon black pigment particles, decrease electromagnetic scattering signals by attenuating excitation and scattered light. Therefore, experimental validation of proposed specific targeted improvements of detection signals was required in order to ascertain whether a black ink's light absorptive properties would mask any potentially useful back-scattering signals of additive metal particles. FIG. 3 illustrates how back-scatter dynamics compare to front-scatter dynamics. Advantageously, back-scattering detection modes avoid typical front-scatter design constraints for drop detection modules as they position the light source and the photodetectors on the same side of the printbar and/or printhead, as illustrated schematically in FIG. 4B. This flexibility avoids the need to align components of the system (i.e., the detector and the light source) at opposite points spanning the print zone, as illustrated in FIG. 4A. The present methods and ink compositions offer improvements to existing back-scatter detection regimes.

EXAMPLES

Example 1

Silver Additive for Boosting Ink Drop Light-Scattering Signal

Figure 5:
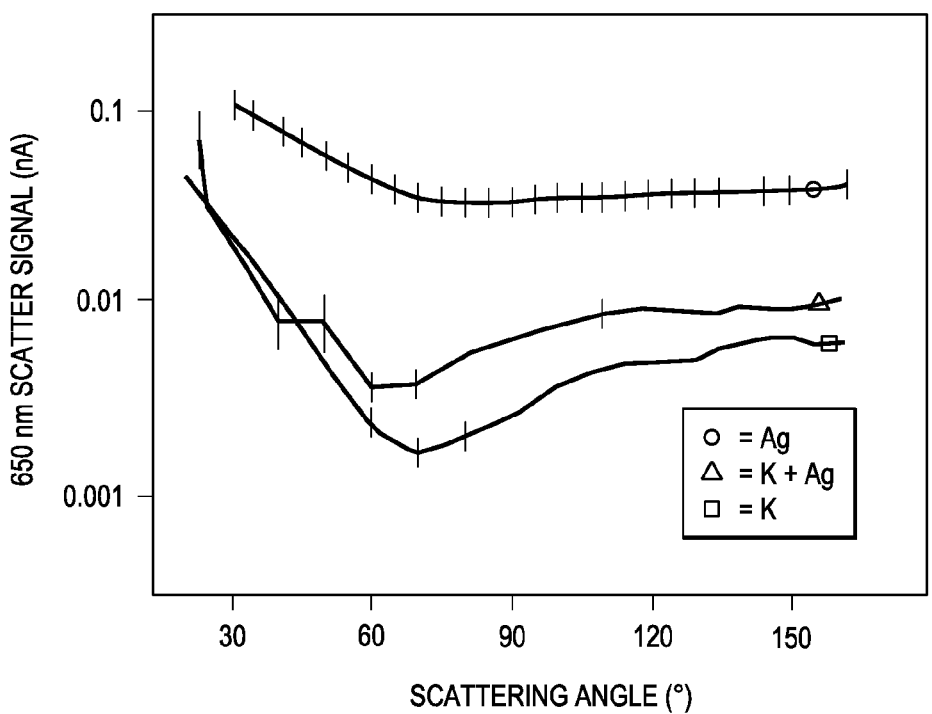
FIG. 5 is a graph showing angle-dependent scattering of a doped black ink in accordance with an embodiment, compared to the same ink lacking the dopant and also compared to an ink containing the silver dopant but not the black colorant.

A baseline black ink (K) was doped using a Cabot silver-particle-containing ink, and its light-scattering properties were evaluated along with baseline carbon black-based black ink and the stock Cabot silver ink containing a 20 wt. % dispersion of 30-50 nm silver particles in a water/ethylene glycol mixture. The LSDD assembly was capable of measuring LSDD signals at angles ranging from near 0 to 180° with less than 5° resolution. The detection system was similar to those depicted in FIGS. 4A-B, with the detector being capable of moving around the drop trajectory line (i.e., the pivot point of the detector) in an orthogonal plane, coplanar to the collimated source light propagation vector. The laser light was a 650 nm wavelength source and light-scattering signals were measured at angles ranging from about 20 to about 160°. LSDD baseline signals were established by testing the scattering responses native to the metallic ink control (top line in FIG. 5) and the baseline black ink (bottom line in FIG. 5) alone. The unmixed silver ink (control) rendered strong scattering signals largely regardless of the relative positions of the incident light and detector. The metallic inks thus showed characteristics similar to bulk metals which absorb a majority of incident electromagnetic radiation (showing high absorption coefficients, k), yet permit energy penetration only short distances into the material. As such, the incident energy transfers to the bonding electrons which, in turn, re-emit the light providing a strong reflection response. After combining the control silver ink with baseline black K (at a 1:1 volumetric ratio), it was found that the mixture enhanced the LSDD signal output as if the mixed ink had partially adopted metallic scattering properties. Responses were readily increased by more than 2 to 5 fold, as shown in FIG. 5, comparing the middle line to the bottom line in FIG. 5. Measured at about 60° to about 160° scattering angle, the silver doped black ink sample demonstrated increased light-scattering compared to baseline black ink.

Example 2

Silver Additive for Retaining Baseline Optical Density

Figure 6:
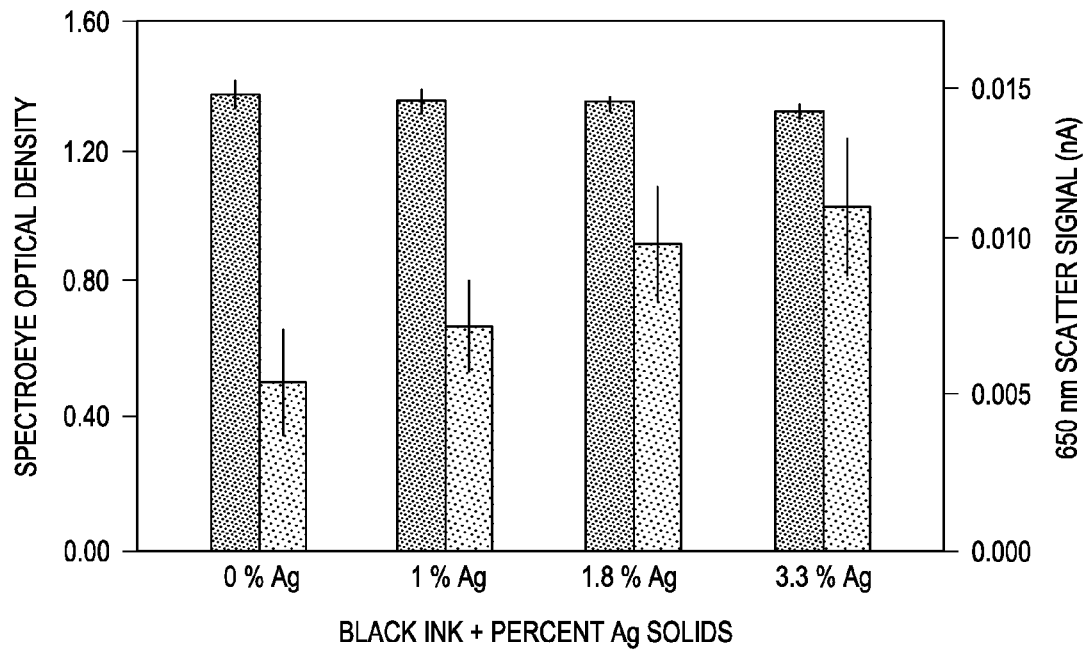
FIG. 6 is a bar graph showing light back-scattering from ink drops in flight, and black optical density (KOD) of ink marks on HP office paper, as silver dopant concentration increases from 0-3.3 wt. % (referenced to the total ink weight).

Referring to FIG. 6, in another series of tests, a baseline carbon black-based black ink containing about 4.5 to about 6 wt. % pigment solids concentration was combined with various silver particle loadings from 0% to 3.3% silver. The silver doped black inks were tested for light-scattering at 650 nm excitation wavelength (light source) and were also evaluated for optical density. In all evaluations, the inks were also tested for potential to viably jet (jettability). Light-scattering responses in mixtures of baseline black ink and silver particles increased proportionally with the silver-solids additive concentration, as indicated in FIG. 6 (hatched bars). It was also found that optical density ratings from 100% fill prints (all nozzles firing in unison) proved indistinguishable from baseline black K behavior (FIG. 6 solid bars). For all of the doped inks, coagulation responses were not observed and decap behaviors were well-mapped to those typically found for the baseline black ink. The doped black ink formulations boost scattering in ways that will potentially lead to LSDD using light emitting diodes instead of laser light sources, and potentially allow for improved drop detection and nozzle monitoring using lower-grade sensors. Silver demonstrated a relatively uniform scattering response across the visible and near infrared excitation wavelength range.

Example 3

LSDD Signal vs. Scattering Angle with Silver Doped Black Ink

Silver doped black ink was prepared using a carbon black-based black ink (Hewlett-Packard HP88) to which was added various amounts of a colloidal silver mixture (from water or ethanol stocks). The resulting silver-doped black ink was subsequently tested in a printer/LSDD assembly similar to that illustrated in FIG. 4C. The colloidal silver was obtained from Cabot and demonstrated a particle size of approximately 40 nm. Drops of each ink, (weighing 7 ng each) were ejected and the LSDD signals were measured at various scattering angles, using an assembly like that illustrated in FIG. 4C.

Figure 7:
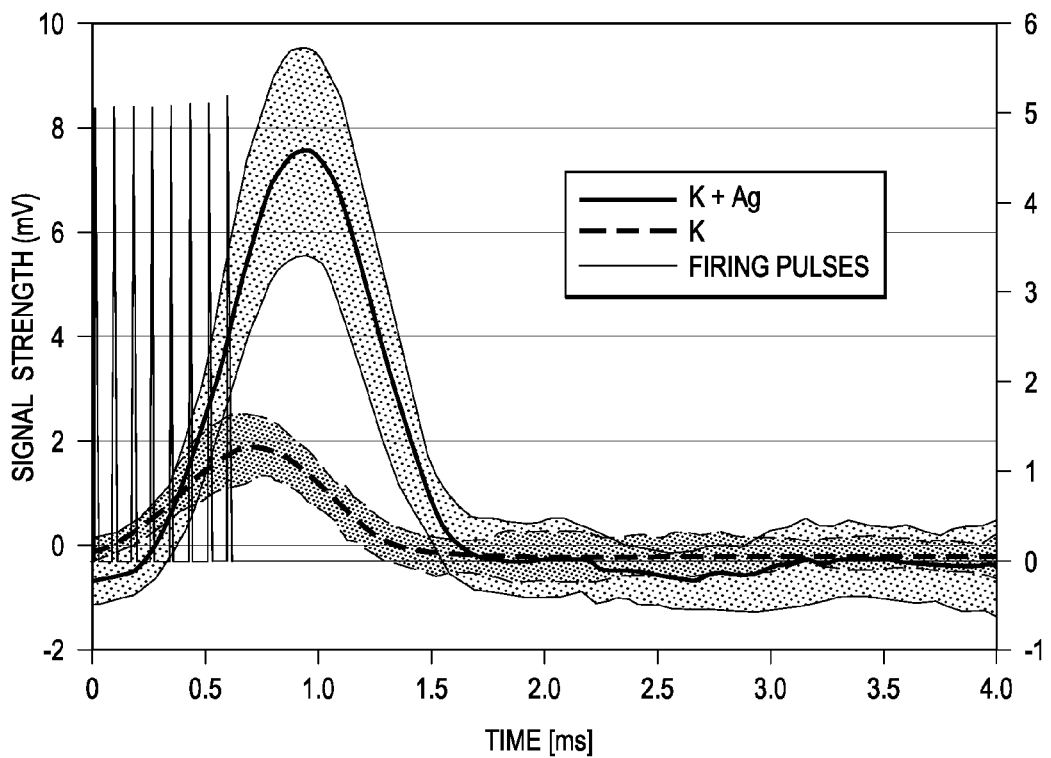
FIG. 7 is a graph showing the increased back-scatter signal strength at a 160° scattering angle resulting from a silver-doped black ink according to an embodiment, compared to the ink lacking the silver dopant.
Figure 8:
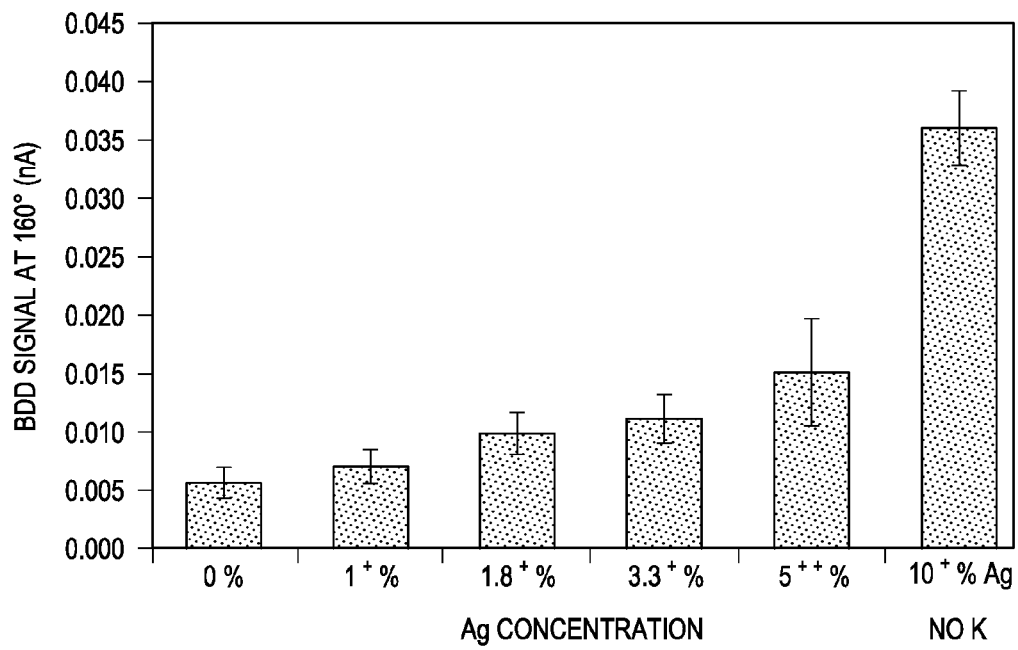
FIG. 8 is a bar graph showing the back-scatter drop detection signal increase of silver-doped carbon black-based inks according to embodiments, compared to control inks containing no silver (i.e., the 0% bar) or no black colorant (i.e., the 10% bar).

The K-silver back-scattering boost is apparent in FIG. 7, which shows the nozzle firing pulse frequency and the back-scattering signal strengths of the control black ink and the silver added black ink rendered during the ejected drop's time of flight. Up to 3 fold increased back-scattering response, measured at a 160° angle, was demonstrated with a 5 wt. % silver doped black ink, as shown in the bar graph presented in FIG. 8. Signal strength was measured using a high-sensitivity low-noise light-to-voltage optical converter (TSL257, Texas Advanced Optoelectronic Solutions, Inc., Plano, Tex.).

Figure 9:
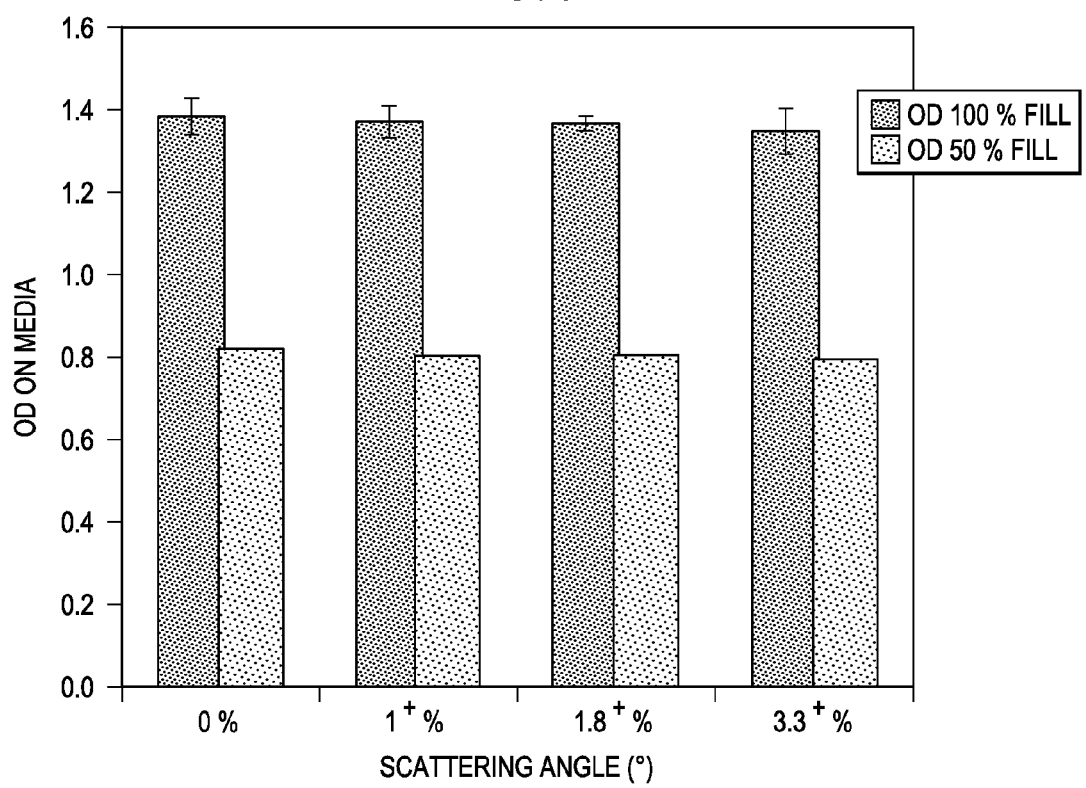
FIG. 9 is a bar graph showing the black optical density (KOD) on print media of silver-doped black inks according to embodiments, compared to a control ink lacking the dopant, at 100% fill (dark bars) and at 50% fill (light bars).
Figure 10:
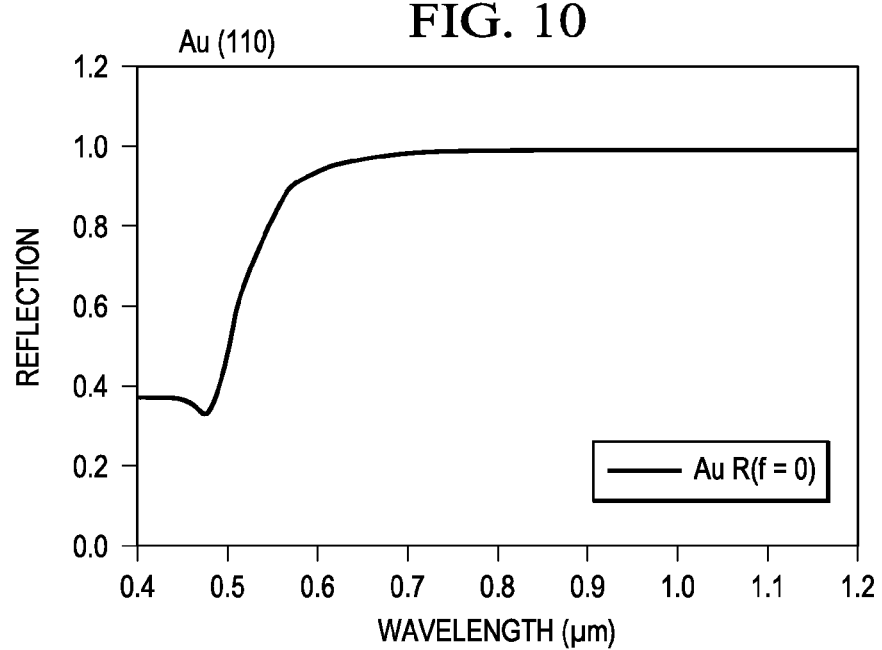
FIG. 10 is a graph showing gold reflectivity over the wavelength range of about 400 nm to 1200 nm.

The black ink optical density (KOD) on HP bright white media shows only a slight dependence on silver concentration when added in amounts up to 3.3 wt. % of the ink, as shown in FIG. 9. The silver additive was found to boost the back-scatter signal strength without compromising black ink performance on paper, when optical density of the printed product is assessed at either 50% fill or 100% fill. The highest practical concentration of silver dopant in the black ink is estimated to be 5 wt. %, because above that concentration the silver becomes detectible in the printed image, i.e., the optical density becomes noticeably degraded. For most embodiments, the lowest practical amount of silver is estimated to be about 1.5 wt. %. Less than this amount of silver does not boost the light-scattering property of the ink sufficiently above the background noise level in most cases.

Example 4

Gold Additive for Boosting an Ink Drop Backscattering Signal

Figure 11:
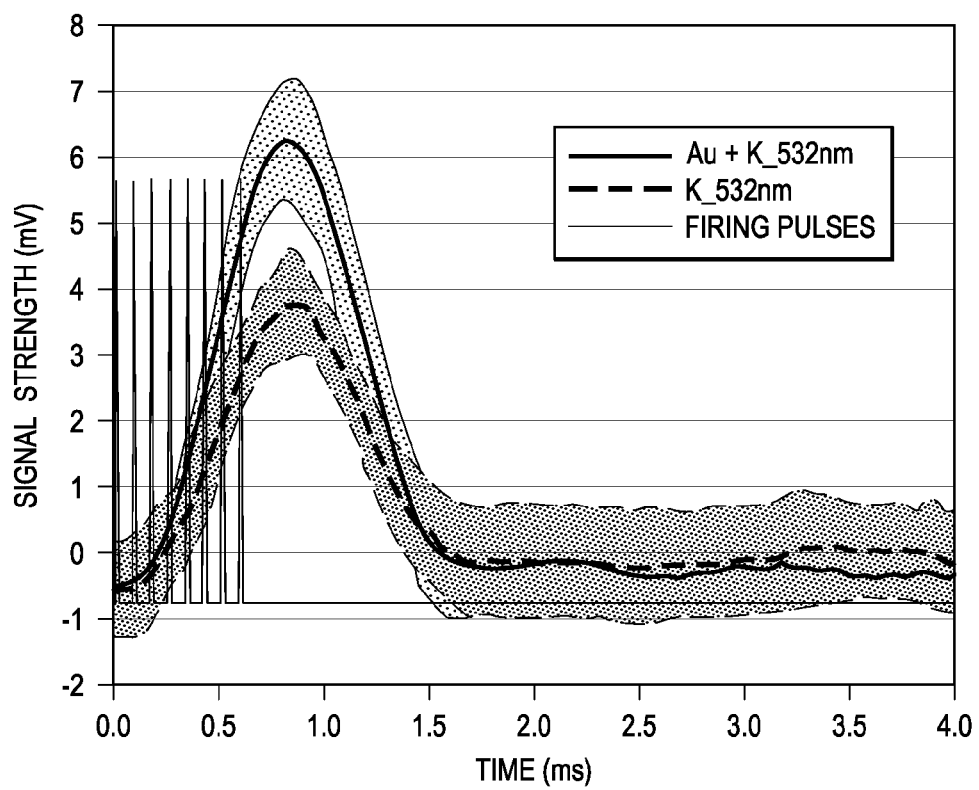
FIG. 11 is a graph showing the increased back-scatter signal strength at a 160° scattering angle provided by a gold-doped black ink using a 532 nm excitation wavelength, according to an embodiment, compared to the ink lacking the gold dopant.
Figure 12:
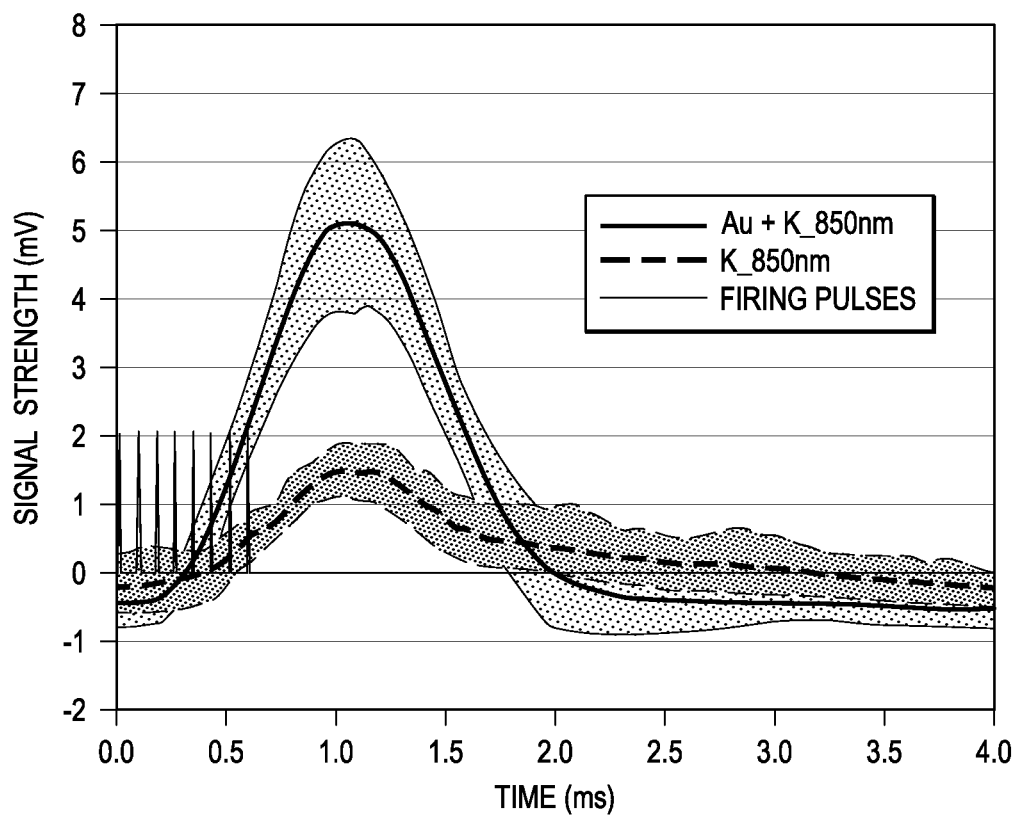
FIG. 12 is a graph showing the increased back-scatter signal strength at a 160° scattering angle provided by a gold-doped black ink using a 850 nm excitation wavelength, according to an embodiment, compared to the ink lacking the gold dopant.

Gold doped black ink was prepared by mixing Hewlett-Packard HP88 black ink with gold-doped vehicle stocks (initial Au concentration in stock solutions about 10 wt. %), and tested as described above. The gold doped black ink was tested against gold reflection over the excitation wavelength range of about 400-1200 µm. As shown in FIG. 11, with approximately 5 wt. % gold dopant, the back-scatter signal strength of the black ink was increased 1.8 fold when measured using 532 nm (green) excitation wavelength light, and was 4.2 fold when measured at 850 nm excitation wavelength, as shown in FIG. 12. At 850 nm (near infrared), the gold doped black ink demonstrated 99% reflectance and increased the signal threefold compared to baseline black inks versus the doped ink's 70% reflectance observed at 532 nm.

Compared to clear vehicle, the gold/vehicle control mixture increased the back-scatter signal 1.7 fold at 850 nm excitation wavelength and 1.5 fold at 532 nm excitation wavelength. The gold doped black ink boosted the BDD signal even more significantly, from 1.8 fold at 532 nm excitation wavelength to 4.2 fold at 850 nm, compared to undoped black ink. The gold additive has potential advantages in some inkjet ink drop/nozzle monitoring applications because of its excitation wavelength-dependent back-scattering properties. For example, in some applications in which an existing drop detection system with a green laser is already in place, it may be preferable to match the ink to the existing laser wavelength.

The above discussion is meant to be illustrative of the principles and various embodiments of the invention. Numerous variations and modifications will become apparent to those skilled in the art once the above disclosure is fully appreciated. For example, although the use of colloidal dopants or metal additives are described in the context of black inks, it should be understood that the light-scattering property of other types of inks formulations of any color may be boosted in similar fashion by addition of a suitable colloidal dopant. The results demonstrated herein with silver and gold dopants are considered representative to at least some extent of other dopants containing other Group IB, IIB and III-VII metals and semi-metals of the Periodic Table of the Elements. Where the context allows, it is intended that the following claims be interpreted to embrace all such variations and modifications.

What is claimed is:

1. A black inkjet ink comprising:
   a liquid vehicle;
   a black colorant dispersed in said vehicle; and
   a colloidal dopant dispersed in said vehicle, said colloidal dopant being visually undetectable in a printed mark produced by said black ink after said ink is jetted onto a substrate, wherein said ink comprises about 0.10 wt. % to about 10 wt. % said colloidal dopant, wherein a drop of said ink increases light-scatter of an incident collimated light beam relative to a drop of said ink lacking said colloidal dopant, during drop-in-flight detection of light-scattering, and wherein said ink has a printed optical density that is at least 90% of that of the ink without said colloidal dopant.

2. The black inkjet ink of claim 1, wherein said increased light-scatter comprises at least 1.3 fold greater back-scattering signal strength relative to said ink lacking said colloidal dopant.

3. The black inkjet ink of claim 1, wherein said colloidal dopant comprises metal particles about 5 nm to about 100 nm in diameter or longest dimension.

4. The black inkjet ink of claim 3, wherein said metal dopant particles are about 40 nm to about 60 nm in diameter or longest dimension.

5. The black inkjet ink of claim 1, wherein said colloidal dopant comprises gold, silver, iridium, platinum, rhodium, ruthenium, silicon, hafnium, chromium or aluminum and said collimated light beam is in the visible or near infrared wavelength range.

6. The black inkjet ink of claim 1, wherein said black colorant comprises carbon black, a black dye, or a combination thereof.

7. An inkjet ink set comprising:
a black inkjet ink comprising:
  a liquid vehicle;
  a black colorant dispersed in said vehicle; and
  a colloidal dopant dispersed in said vehicle,
wherein said ink comprises about 0.10 wt. % to about 10 wt. % said colloidal dopant,
said colloidal dopant being visually undetectable in a printed mark produced by said black ink on a substrate, and
a drop of said black ink having increased light-scattering of an incident collimated light beam relative to a drop of the same ink without said colloidal dopant, during drop-in-flight light-scattering detection, and
said black ink having a printed optical density at least 90% of that of the same ink without said colloidal dopant; and
at least one other inkjet ink.

8. The inkjet ink set of claim 7, wherein said increased light-scatter comprises at least 1.3 fold greater back-scattering signal strength compared to said black inkjet ink lacking said colloidal dopant.

9. A method of assessing nozzle condition in an array of inkjet nozzles, comprising:
ejecting at least one black inkjet ink drop from an inkjet nozzle in an array of inkjet nozzles, said at least one black ink drop comprising a liquid vehicle; a black colorant dispersed in said vehicle; and a colloidal dopant dispersed in said vehicle, wherein said ink comprises about 0.1 wt.% to about 10 wt.% said colloidal dopant, said colloidal dopant being visually undetectable in a printed mark produced by said black ink on a substrate, and said black ink having a printed optical density at least 90% of that of said ink without said colloidal dopant;
causing light from a collimated light source to be directed onto a said ink drop in flight;
detecting a light-scattering signal strength from at least one said drop in flight; and
determining from said detected light-scattering signal strength an operational condition of said inkjet nozzle.

10. The method of claim 9, wherein said detected light-scattering signal strength comprises at least 1.3 fold greater back-scattering signal strength compared to a said black inkjet ink lacking said colloidal dopant.

11. The method of claim 9, wherein said colloidal dopant comprises gold, silver, iridium, platinum, rhodium, ruthenium, silicon, hafnium, chromium or aluminum particles, and said collimated light beam is in the visible or near infrared wavelength range.

12. The method of claim 9, wherein said operational condition is at least one of (a) non-functioning nozzle, (b) misdirected droplet stream from said nozzle, (c) reduced or augmented velocity from said nozzle, and (d) reduced or increased median drop weight of a droplet stream from said nozzle.

13. The method of claim 12, wherein determining said at least one operational condition includes detecting at least one of said (b) misdirected ink drop stream, (c) ink drop stream velocity and (d) ink drop stream mean drop weight, which differs more than ±10% from that of the ink without said colloidal dopant.

* * * * *